UNITED STATES PATENT OFFICE.

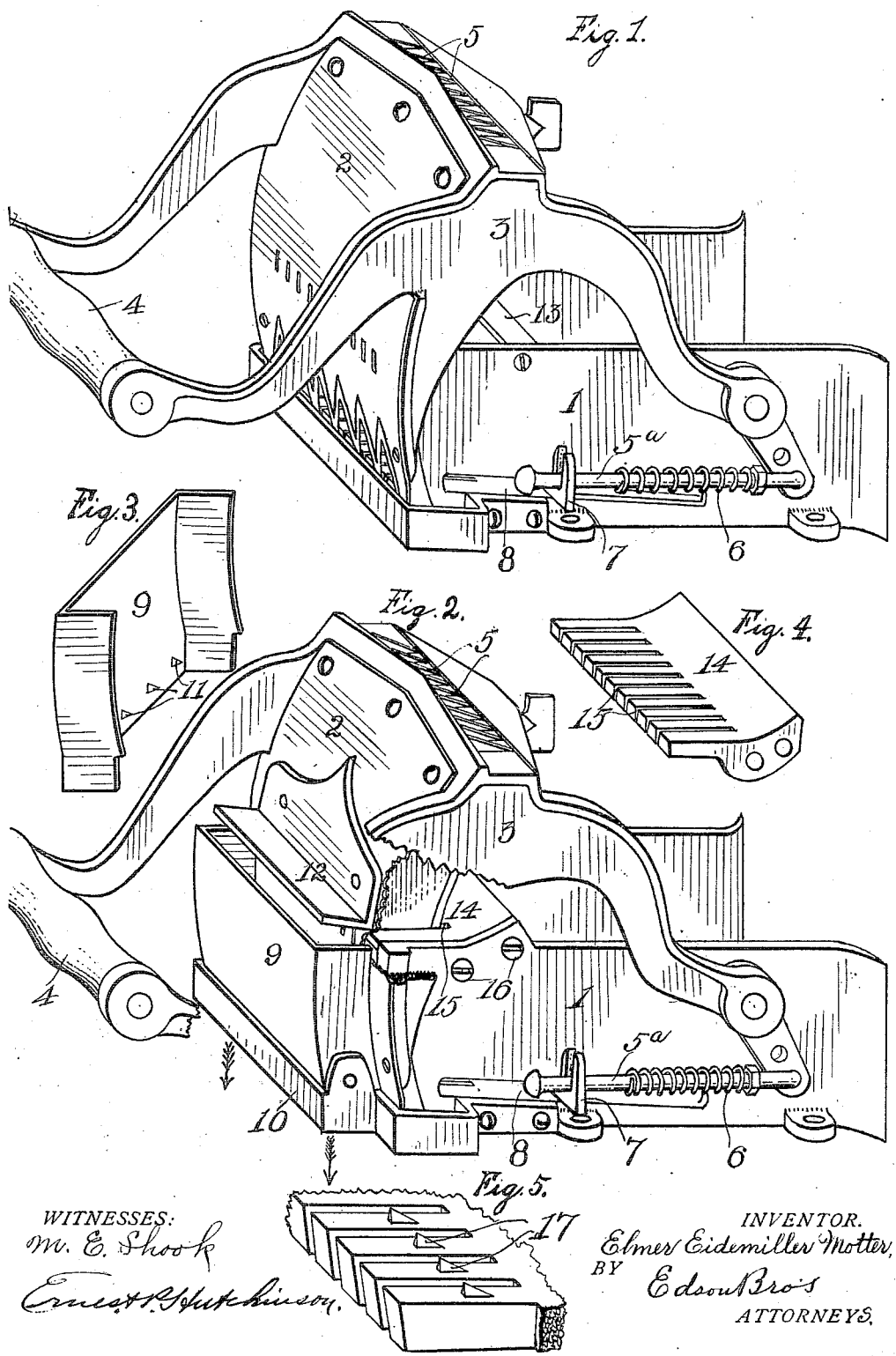
E. E. MOTTER.
MACHINE FOR CUTTING FAT AND OTHER SUBSTANCES.
APPLICATION FILED DEC. 7, 1909.
971,624.
Patented Oct. 4, 1910.

ELMER EIDEMILLER MOTTER, OF TIPPECANOE CITY, OHIO.

MACHINE FOR CUTTING FAT AND OTHER SUBSTANCES.

971,624.  Specification of Letters Patent.  Patented Oct. 4, 1910.

Application filed December 7, 1909. Serial No. 531,898.

*To all whom it may concern:*

Be it known that I, ELMER EIDEMILLER MOTTER, a citizen of the United States, residing at Tippecanoe City, in the county of Miami and State of Ohio, have invented certain new and useful Improvements in Machines for Cutting Fat and other Substances; and I do hereby declare the following to be a full, clear, and exact description of the invention, such as will enable others skilled in the art to which it appertains to make and use the same.

My invention relates to improvements in machines for cutting fat and other substances and is especially designed for cutting fat into pieces of convenient size to be rendered into lard.

It has been my aim in constructing the present machine to improve upon the one covered by my U. S. Patent, No. 862,927, dated August 13, 1907.

My principal object is to provide for more uniformly gaging the thickness of the blocks of fat cut off by the cross-cut knife and consequently preventing the possibility of any pieces being discharged from the machine which are too large for the desired purpose.

Other objects will become apparent from the following description.

The present invention consists principally in providing my previously patented machine with a gage which arrests the fat fed below the cross-cut knife whereby the amount fed at each operation and consequently the thickness of the rectangular blocks cut off by the cross-cut knife at each operation will be uniform.

Another object is to insure the proper discharge of the pieces of fat after they are cut.

A further object is to insure an orderly entrance of the longitudinally sliced portion of fat below the cross-cut knife and against the gage where it is in position to be cut off by the next stroke of said knife.

Still another object is to provide for more securely holding the fat in position during the descent of the cross-cut knife so as to accomplish the proper gaging and cutting of thin and flimsy or tough fat.

The invention also consists in the features of construction and combinations of parts hereinafter described and specified in the claims.

In the accompanying drawing: Figure 1 is a perspective view of a machine made in accordance with my above referred to patent. Fig. 2 is a perspective view of a machine embodying the present improvements attached thereto. Fig. 3 is a detailed perspective view of the gage-cup. Fig. 4 is a detailed view of the top guard, and Fig. 5 is a fragmentary detailed view of a portion of the edge of the bottom of the machine which is arranged in juxtaposition to the gage-cup.

Referring more particularly to the drawing, 1 designates the box or casing which is made like that illustrated and described in my previously referred to patent except for the additions to be hereinafter explained. The cross-cut knife 2 is carried by a pair of levers 3 pivoted to the sides of the box and having a handle 4 for reciprocating said knife. I also employ the longitudinally slicing knives 5 which are placed at right angles to the cross-cut knife. The fat is fed by a sliding plate in the bottom of the box which is operated by means of the rods $5^a$ and coiled springs 6 which engage lugs 7 projecting through slots 8 in the sides of the box. Said rods are connected to the levers 3 whereby the feeding of the fat is accomplished during the raising of the knives after one cutting and preparatory to another. The gage-cup 9 is preferably made of sheet metal in a separate piece from the guard 10 to which it is attached. Said gage-cup incloses a space of desired size immediately in front of the discharge end of the machine. The fat, as it is fed below the cross-cut knife, is, therefore, arrested by this gage-cup at each feeding operation. A few sharp or edged fins or teeth 11, Fig. 3, may be required on the lower inner surface of the gage cup to support the outer edge of the fat which lies in contact with said gage-cup during the operation of cutting off in rectangular blocks the portion of the fat, previously slit or cut longitudinally. As these fins or teeth are sharp, they do not obstruct the discharge opening at the bottom of the gage-cup.

A plunger 12 is fastened to the outer face of the cross-cut knife and fits the interior of the gage-cup, the latter being curved longitudinally to conform to said knife. The position of the plunger on the cross-cut knife is such that it comes in contact with the fat after it is cut into pieces by said knife and simultaneously with the completion of said cutting forces or discharges the pieces or blocks out through the opening at the bottom of the gage cup, as indicated by the arrows in Fig. 2.

Instead of the plain strip 13, which extends across the box or casing behind the path of the knives in the old machine, as illustrated in Fig. 1, I now provide a top guard or plate 14 provided with slots 15 through which the longitudinally slicing knives travel. This guard plate is secured in this position spanning the top of the box in any convenient manner, such as by the screws 16. The outer edge of this plate is flared or curved upwardly to guide the fat below the knives while the slotted portion of the plate assures an orderly entrance of the sliced portion of fat below the cross-cut knife and against the gage-cup.

As illustrated in Fig. 5, a few small teeth 17 are arranged between the slots on the upper surface of the inner edge of the bottom of the machine. These teeth are inclined toward the cross-cut knife and engage the fat below the longitudinally slicing knives during their cutting operation, thereby aiding said knives and the cross-cut knife in holding the fat against the gage-cup.

I claim:—

1. In a machine of the character described, the combination, with a casing, of arms pivoted to the sides of said casing, a blade carried by said arms and adapted to swing in an arcuate path across one end of the casing, and a gage extending beyond that end of the casing and adapted to arrest the material being cut at a given distance beyond the path of said blade, said gage being arcuate to conform to the path of the blade.

2. In a machine of the character described, the combination, with a casing, of arms pivoted to the sides of said casing, a blade carried by said arms and adapted to swing in an arcuate path across one end of the casing, a gage extending beyond that end of the casing and adapted to arrest the material being cut at a given distance beyond the path of said blade, said gage being arcuate to conform to the path of the blade, and a plunger mounted on the blade and adapted to fit within the gage for the purpose specified.

3. In a machine of the character described, the combination, with a casing, a knife mounted to reciprocate across one end thereof, and a gage adapted to arrest the material at a given distance beyond the path of said knife, of inwardly projecting fins arranged near the lower edge of said gage for the purpose specified.

4. In a machine of the character described, the combination, with a casing, a cross-cut knife mounted to reciprocate across the end thereof, a series of knives arranged at right angles to said cross-cut knife, of a guard plate spanning the top of the casing adjacent to said knives and having its outer edge slotted to receive the knives which are arranged longitudinally of the casing.

5. In a machine of the character described, the combination, with a casing, a cross-cut knife mounted to reciprocate across the end thereof, a series of knives arranged at right angles to said cross-cut knife, of a guard plate spanning the top of the casing adjacent to said knives and having its outer edge slotted to receive the knives which are arranged longitudinally of the casing, said plate being also flared or curved upwardly at its inner edge for the purpose specified.

6. In a machine of the character described, the combination, with a casing, a cross-cut knife mounted to reciprocate across the same, and a series of knives arranged at right angles to said cross-cut knife, of means to arrest the material at a given point beyond the cross-cut knife whereby the blocks into which the knives are adapted to cut material will always be of uniform thickness, and means to engage the extremity of the projecting end of the material and to support it during the cutting operation.

7. In a machine of the character described, the combination, with a casing, a cross-cut knife mounted to reciprocate across the same, and a series of knives arranged at right angles to said cross-cut knife, of means to arrest the material at a given point beyond the cross-cut knife whereby the blocks into which the knives are adapted to cut material will always be of uniform thickness, means to engage the extremity of the projecting end of the material and to support it during the cutting operation, and means to forcibly discharge the blocks of the material after they are cut.

In testimony whereof, I affix my signature, in presence of two witnesses.

ELMER EIDEMILLER MOTTER.

Witnesses:
S. O. MITCHELL,
H. J. FAVERITE.